United States Patent [19]
Stephenson et al.

[11] 3,940,083
[45] Feb. 24, 1976

[54] VEHICLE SENSITIVE RETRACTOR WITH BELL INERTIA MECHANISM

[75] Inventors: Robert L. Stephenson, Sterling Heights; Robert C. Pfeiffer, Rochester; Yogendra Singh Loomba, Washington, all of Mich.

[73] Assignee: Allied Chemical Corporation, New York, N.Y.

[22] Filed: July 10, 1974

[21] Appl. No.: 487,846

[52] U.S. Cl. .......................................... 242/107.4 A
[51] Int. Cl.² .......................................... B65H 75/48
[58] Field of Search ........... 242/107.4; 280/150.5 B; 297/388

[56] References Cited
UNITED STATES PATENTS

| | | | |
|---|---|---|---|
| 3,834,646 | 9/1974 | Heath | 242/107.4 |
| 3,838,831 | 10/1974 | Bell | 242/107.4 |
| 3,838,832 | 10/1974 | Romanzi | 242/107.4 |

*Primary Examiner*—Edward J. McCarthy
*Attorney, Agent, or Firm*—John P. Kirby, Jr.

[57] ABSTRACT

The vehicle sensitive retractor has an inertia mechanism which includes a bell. A support post is provided upon which the bell rests. Prior to actuation, the bell has an infinite variety of operable static positions to which the bell is adjustable according to the position in which the retractor is oriented by virtue of installation in the vehicle. As a result, the retractor may be tilted for installation without having to redesign the inertia mechanism. An actuating means is disposed on top of the bell and is connected to a reel locking means. The actuating means is disposed in an unlocked position when the bell is in any one of its infinite variety of operable static positions. The actuating means is moved to a locked position by the bell during emergency situations to lock a reel and prevent further unwinding of a safety belt from the reel.

8 Claims, 3 Drawing Figures

VEHICLE SENSITIVE RETRACTOR WITH BELL INERTIA MECHANISM

BACKGROUND OF THE INVENTION

1. Field of the Invention

This invention relates to safety belt retractors for occupants of vehicles, such as automobiles. More particularly, this invention relates to an inertia responsive safety belt retractor which is vehicle-sensitive. Such a retractor is responsive to acceleration, deceleration or change in orientation of the vehicle, which may result from cornering, braking or overturning of the vehicle. In response thereto, the retractor locks to prevent further withdrawal of the safety belt. Still more particularly, this invention relates to an improved, universal inertia mechanism and support assembly which allows the retractor to be placed in an infinite variety of positions within the vehicle.

2. Description of the Prior Art

Vehicle sensitive safety belt retractors have been recently developed which should significantly decrease the number of fatalities and serious injuries resulting from motor vehicle accidents. Most of these retractors use an inertia mechanism. Typically, such retractors also include a belt reel which is continually biased in a retracting direction and a pawl which is engagable with ratchet teeth on the belt reel. When the inertia mechanism, such as a pendulum, is displaced from its normally static position by acceleration, deceleration or change in orientation of the vehicle, the inertia mechanism moves the pawl into engagement with the ratchet teeth, preventing further withdrawal of the belt. Patent application Ser. No. 312,534 filed Dec. 6, 1972 in the name of Lon E. Pell, now U.S. Pat. No. 3,838,831 and French Patent No. 71.28062, issued Jan. 17, 1972 to Granges Essem Aktiebolag of Sweden, disclose examples of such a retractor. Canadian Patent No. 940507 in the name of J. Kell, granted to Kangol Magnet Ltd., discloses a conical or bell-shaped pendulum on a pin 36 which is disposed in a substantially vertical position in use, as explained on page 4, lines 3 – 4.

It is desirable to have an improved, universal inertia mechanism and support in which the inertia mechanism is adjustable and does not need to be redesigned for different vehicles. This is desirable because the retractor needs to be mounted in various positions and various orientations within different vehicles, so that the safety belt can be moved without locking the belt reel. Sometimes the retractor needs to be turned partly on its side, that is, tilted.

SUMMARY OF THE INVENTION

The retractor of this invention is vehicle-sensitive and inertia-operated. The retractor has a reel for winding the safety belt, means to lock the reel and thereby restrain an occupant of a vehicle during emergency situations, an inertia mechanism, a support mounted on the retractor for supporting the inertia mechanism, and an actuating means responsive to the inertia mechanism for engaging and operating the means for locking the reel. The retractor has an improved inertia mechanism, support for the inertia mechanism and actuating means. The support for the inertia mechanism is a support post having an upper end and a lower end. The inertia mechanism is a bell which rests on the upper end of the support post. The bell has an infinite variety of operable static positions on the support post to which the bell is adjustable according to the position in which the retractor is oriented by virtue of installation in the vehicle. The actuating means is disposed on top of the bell and is connected to the reel locking means. The actuating means has an unlocked position and a locked position. The actuating means is disposed in the unlocked position when the bell is in any one of its infinite variety of operable static positions. The actuating means is moved to the locked position by the bell during emergency situations to engage the pawl in the ratchet wheels and thereby to lock the reel and prevent further unwinding of the belt.

The bell may be any hollow concave weight, having an open bottom and an interior surface. The interior surface rests on the upper end of the support post. The actuating means is disposed on top of the bell and is connected to the reel locking means. Typically, the reel locking means includes one or more ratchet wheels and a pawl, although other reel locking means may also be used.

The retractor, bell and support post each have a longitudinal axis. The static position of the bell is adjustable in any direction from a static position wherein the longitudinal axis of the bell is disposed at an angle of approximately 0° to an angle of approximately 30° with reference to the longitudinal axis of the retractor and the support post. The longitudinal axis of the support post is disposed substantially parallel to, and preferably coincidently with the longitudinal axis of the retractor. The retractor further includes a support structure including two parallel side walls and a back wall. The longitudinal axis of the support post is disposed substantially parallel to the side walls and the back wall.

The inertia mechanism and support are universal because they do not have to be redesigned for use in different vehicles in order to have the bell disposed vertically for the purpose of allowing the retractor to remain unlocked in normal operation. If the retractor is turned partly on its side, that is, tilted for installation, the static position of the bell is adjustable to such tilted installation of the retractor.

DETAILED DESCRIPTION

Figure 1:
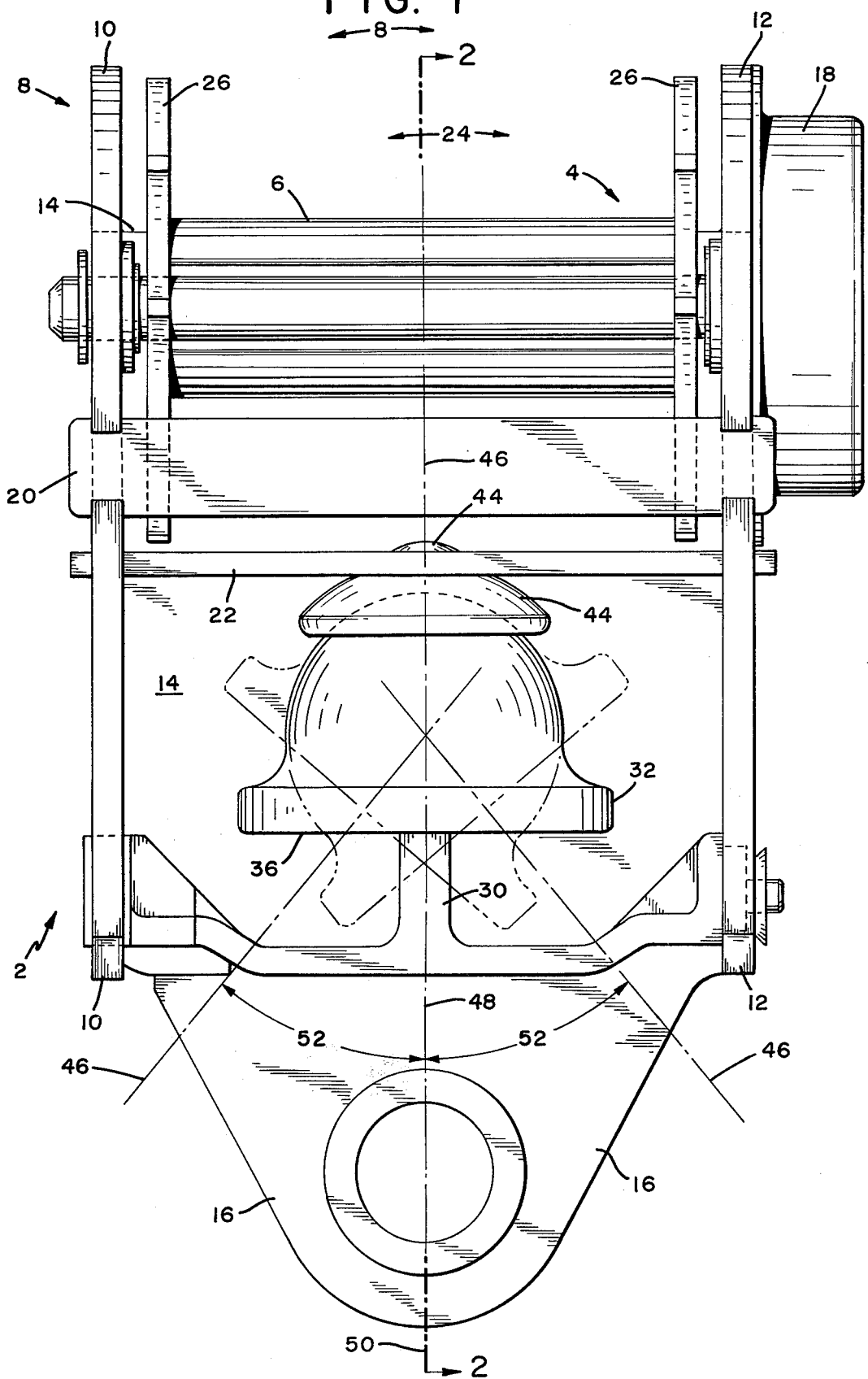
FIG. 1 is a front elevational view of the retractor of this invention.
Figure 2:
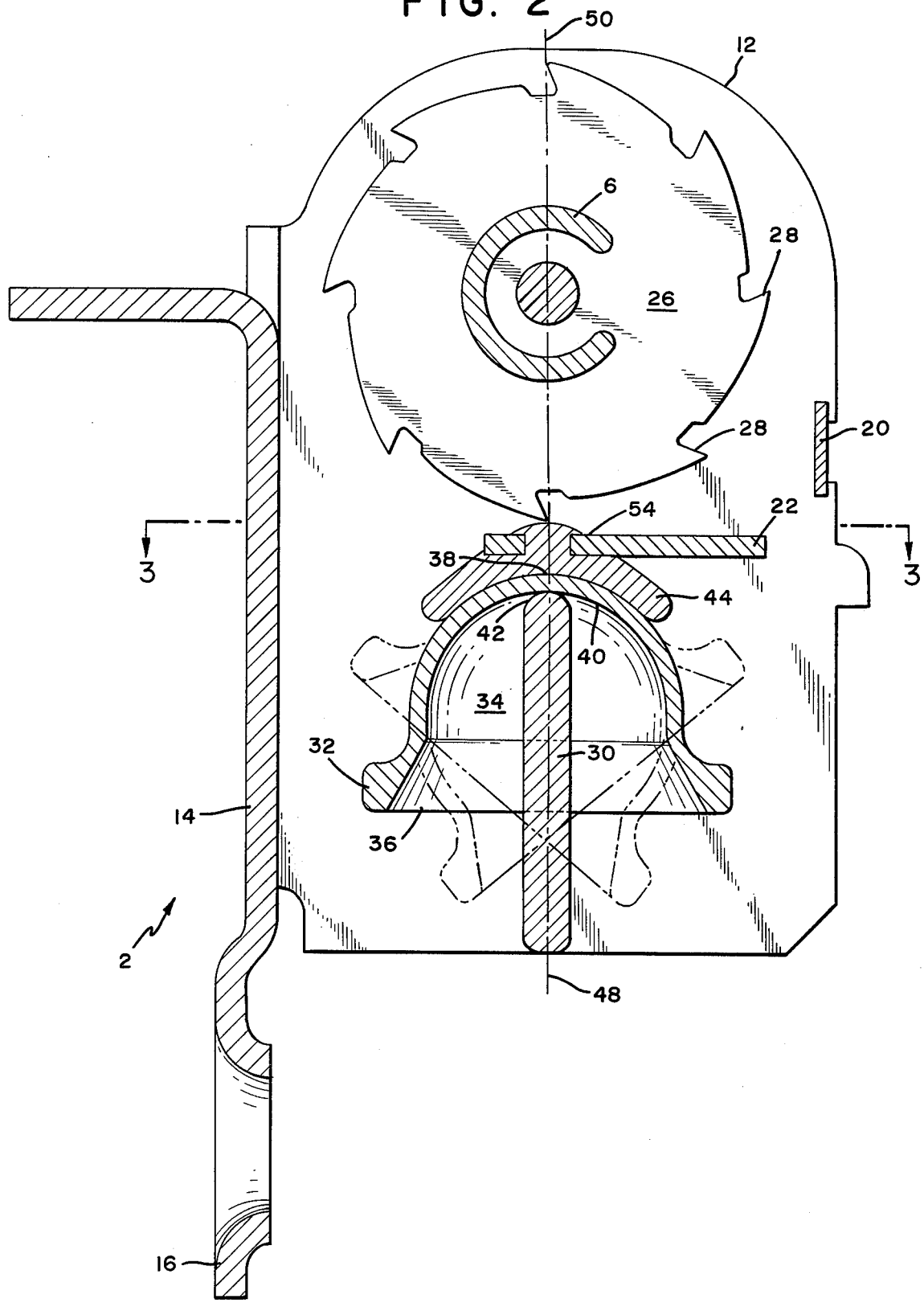
FIG. 2 is a cross-sectional view of FIG. 1 along the lines 2—2.
Figure 3:
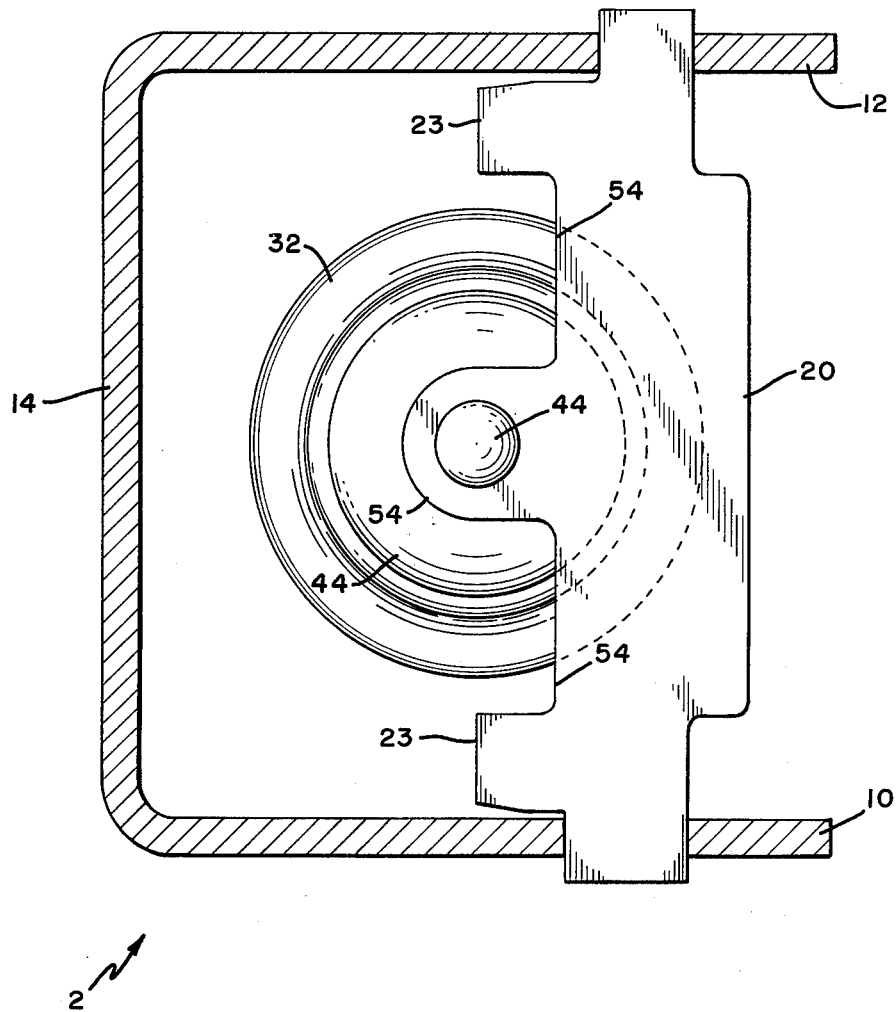
FIG. 3 is a cross-sectional view of FIG. 2 along the lines 3—3.

Referring to FIGS. 1 – 3, the retractor, referred to generally by the numeral 2, has a reel means 4, including a reel shaft 6, rotatably mounted on a support means 8. The support means 8 is a load bearing member and includes two side walls 10 and 12 and a back wall 14. The support means 8 also includes a mounting means 16 in the form of a rigid extension adapted to be bolted or otherwise secured to an anchorage point in a vehicle (not shown).

A belt (not shown) is adapted to be attached to the reel shaft 6 for winding and unwinding thereon. The reel means 4 includes a biasing means, such as a tension return spring, inside a housing 18, which urges the reel shaft 6 to turn in a winding direction. The winding direction of the reel shaft 6 retracts the belt into the retractor 2. The opposite unwinding direction of the reel shaft 6 allows withdrawal of the belt from the retractor 2.

The two side walls 10 and 12 of the support structure 8 are disposed substantially parallel to one another and substantially perpendicular to the back wall 14. The support structure 8 also includes a cross member 20 extending between the side walls 10 and 12 and at the opposite side of the side walls 10 and 12 from the back wall 14.

The retractor 2 further includes a means for locking the reel means 4, such as pawl 22 and a ratchet means 24. The ratchet means 24 includes at least one ratchet wheel 26, and preferably two ratchet wheels 26. The ratchet wheels 26 have ratchet teeth 28 (FIG. 2) on their outer circumferences and are fixedly mounted on the reel shaft 6.

The pawl 22 is pivotally mounted on the side walls 10 and 12 and extend between the side walls 10 and 12. The pawl 22 has two pawl teeth 23 (FIG. 3). The pawl 22 is adapted to pivot from an unlocked position, shown in FIG. 2, to a locked position. In the locked position of the pawl 22, the pawl teeth 23 (FIG. 3) are lifted into engagement with a ratchet tooth 28 of the ratchet wheels 26.

Referring to FIGS. 1 and 2, the retractor 2 further includes an inertia mechanism, a support for the inertia mechanism and an actuating means; all of which are adpated to cooperate to actuate the pawl 22 from its unlocked position to its locked position during emergency situations. The inertia mechanism, support and actuating means may be mounted inside the retractor, as illustrated in the drawings, or may be mounted outside the retractor on the outer side of one of the side walls 10 of the support structure 8. The support for the inertia member is a support post 30 having an upper end and a lower end. The inertia mechanism is a bell 32 which is a concave weight having a hollow interior 34, an open bottom 36, a top central portion 38 and an interior surface 40. A portion of the upper half of the interior surface 40 rests on the upper end 42 of the support post 30. Preferably, the bell 32 is substantially bell-shaped. The upper end of the support post 30 extends through the open bottom 36 into the interior 34 of the bell 32. The actuating means is a substantially conical or dome-shaped member 44 attached to the bottom side of the pawl 22, having an open bottom and resting on top of the bell 32.

If the inertia mechanism and support are mounted on the outer side of one of the side walls 10 of the support structure 8, the pawl 22 must extend through such side wall 10 to be actuated by the actuating means or the pawl and a ratchet wheel may be mounted on the outer side of the side wall. The bell 32 is adapted to oscillate like a pendulum and has an infinite variety of operable static positions to which the bell 32 is adjustable according to the position in which the retractor 2 is placed by virtue of installation in the vehicle.

The bell 32 has a longitudinal axis 46 (FIG. 1) passing through the top central portion 38 of the bell 32. The support post 30 has a longitudinal axis 48 disposed substantially parallel and preferably coincident with the longitudinal axis 50 of the retractor 2. The support post 30 is also disposed substantially parallel to the side walls 10 and 12 and the back wall 14. The bell 32 is adjustable in any direction from a static position wherein the longitudinal axis 46 of the bell 32 is disposed at an angle of approximately 0° to an angle 52 (FIG. 1) of approximately 30° with reference to the longitudinal axis 50 of the retractor 2 and the longitudinal axis 48 of the support post 30, or any angle between 0° to approximately 30°.

When the retractor 2 is disposed in a vehicle so that the longitudinal axis 50 of the retractor 2 and the longitudinal axis 48 of the support post 30 are substantially vertical, the bell 32 assumes an operable static position wherein the angle between the longitudinal axis 46 of the bell 32 and the longitudinal axis 50 of the retractor 2 is 0°. When the retractor 2 has been tilted for installation in a vehicle so that the longitudinal axis 50 of the retractor 2 and the longitudinal axis 47 of the support post 30 assume an angle 52 of up to approximately 30° with the vertical plane, the bell 32 assumes an operable static position in which the longitudinal axis 46 of the bell 32 is disposed at an angle of approximately 30° with reference to the longitudinal axis 50 of the retractor 2.

The bell 32 is capable of adjusting automatically to an infinite variety of operable static positions. In all of the infinite variety of operable static positions to which the bell 32 is adjustable, the longitudinal axis 46 of the bell 32 adjusts to a position substantially parallel to the vertical plane. It is the longitudinal axis 50 of the retractor 2 and the longitudinal axis 48 of the support post 30 that assume an angle with reference to the vertical plane when the retractor 2 is tilted for installation in the vehicle. As a result of this adjustable feature, the retractor is universally mountable in a variety of positions in different vehicles without redesigning of the retractor 2 or its inertia mechanism. This adjustment of the bell 32 takes place by means of the interior surface 40 of the bell 32 tilting in any direction with reference to the upper end 42 of the support post 30, without moving the actuating means, the conical member 44.

During normal operation of the retractor 2, when the vehicle is not in a dangerous situation, the bell 32 continues to rest on the upper end 42 of the support post 30, in a substantially vertical position, in any one of its infinite variety of operable static positions. During normal operation of the retractor 2, when the vehicle is not in a dangerous situation, the conical member 44 rests on the top of the bell 32. The conical member 44 is connected to the underside of the pawl 22 and the pawl 22 remains in its unlocked position.

When the acceleration, deceleration or change in orientation of the vehicle exceeds a predetermined magnitude, the bell 32 is lifted up and off the upper end 42 of the support post 30. Such movement of the bell 32 lifts the conical member 44, which in turn lifts the engaging side 54 (FIG. 3) of the pawl 22, bringing the pawl teeth 23 into engagement with the ratchet wheels 26.

The bell 32 and its associated components provide a simple but effective, vehicle-sensitive, inertia-operated mechanism adapted to lock the retractor 2 and thereby restrain an occupant of a vehicle during dangerous situations. As a result, when the vehicle is subjected to a sudden braking, cornering, or overturning, for example, the pawl 22 locks the ratchet wheel 26 and prevents the belt from being withdrawn any further from the retractor 2, thereby restraining the occupant of a vehicle wearing the safety belt. The bell 32 is a highly reliable inertia mechanism which is inexpensive to manufacture and maintain. A typical location for this retractor is on the back of a seat where the angle of orientation of the retractor changes with the position of the seat.

We claim:

1. In a vehicle-sensitive, inertia-operated safety belt retractor with a reel for winding the safety belt, means to lock the reel and thereby restrain an occupant of a vehicle during emergency situations, an inertia mechanism, a support mounted on said retractor for supporting the inertia mechanism and an actuating means responsive to said inertia mechanism for operating the means for locking the reel, the improvement wherein:

said support for the inertia mechanism is a support post having an upper end and a lower end;

said inertia mechanism is a bell which rests on the upper end of said support post, said bell having a hollow interior, an open bottom and an interior surface; approximately the upper half of said interior surface of said bell having a substantially hemispherical interior pivot area; said upper end of said support post extending through the open bottom of said bell into said hollow interior of said bell; said bell having a plurality of support points within said interior pivot area of said bell, said upper end of said support post supporting said bell at different support points within said interior pivot area of said bell depending upon the orientation of said retractor resulting from installation in a vehicle, said bell having an infinite variety of operable static positions on said support post to which said bell is adjustable with reference to said support post according to the position in which the retractor is oriented by virtue of installation in the vehicle; during dangerous situations said bell pivotable with reference to said support post on any one of said different support points within said interior pivot area; and said actuating means is disposed on top of said bell and is connected to said reel locking means, said actuating means having an unlocked position and a locked position, said actuating means being disposed in said unlocked position when said bell is in any one of said infinite variety of said operable static positions, said actuating means being moved to said locked position by said bell during dangerous situations to lock said reel and prevent further unwinding of said belt.

2. The vehicle-sensitive, inertia-operated safety belt retractor according to claim 1 wherein:

said retractor has a longitudinal axis;

said bell has a longitudinal axis;

said support post has a longitudinal axis disposed substantially parallel to the longitudinal axis of said retractor; and the static position of said bell is adjustable in any direction from a static position wherein said longitudinal axis of said bell is disposed at an angle of approximately 0° to an angle of approximately 30° with reference to the longitudinal axis of said retractor.

3. The vehicle-sensitive, inertia-operated safety belt retractor according to claim 1 wherein:

said retractor further includes a support structure including two parallel side walls and a back wall, said side walls being disposed approximately perpendicular to said back wall;

said support post has a longitudinal axis which is disposed substantially parallel to said side walls and said back wall;

said bell has a longitudinal axis; and the static position of said bell is adjustable in any direction from a static position wherein said longitudinal axis of said bell is disposed at an angle of approximately 0° to an angle of approximately 30° with reference to the longitudinal axis of said support post.

4. The vehicle-sensitive, inertia-operated safety belt retractor according to claim 1 wherein:

said retractor has a longitudinal axis;

said inertia member has a longitudinal axis;

said support means has a longitudinal axis disposed substantially parallel to the longitudinal axis of said retractor; and the static position of said inertia member is adjustable in any direction from a static position wherein said longitudinal axis of said inertia member is disposed at an angle of approximately 0° to an angle of approximately 30° with reference to the longitudinal axis of said retractor.

5. The vehicle-sensitive, inertia-operated safety belt retractor according to claim 1 wherein:

said retractor further includes a support structure including two parallel side walls and a back wall, said side walls being disposed approximately perpendicular to said back wall;

said support means has a longitudinal axis which is disposed substantially parallel to said side walls and said back wall;

said inertia member has a longitudinal axis; and the static position of said inertia member is adjustable in any direction from a static position wherein said longitudinal axis of said inertia member is disposed at an angle of approximately 0° to an angle of approximately 30° with reference to the longitudinal axis of said support means.

6. In a vehicle-sensitive, inertia-operated safety belt retractor with a reel for winding the safety belt, means to lock the reel and thereby restrain an occupant of a vehicle during emergency situations, an inertia mechanism, a support mounted on said retractor for supporting the inertia mechanism and an actuating means responsive to said inertia mechanism for operating the means for locking the reel, the improvement wherein:

said support for the inertia mechanism is a support post having an upper end and a lower end;

said inertia mechanism is a bell which rests on the upper end of said support post, said bell having a hollow interior, an open bottom and an interior surface; approximately the upper half of said interior surface of said bell having a substantially hemispherical interior pivot area; said upper end of said support post extending through the open bottom of said bell into said hollow interior of said bell; said bell having a plurality of support points within said interior pivot area of said bell, said upper end of said support post supporting said bell at different support points within said interior pivot area of said bell depending upon the orientation of said retractor resulting from installation in a vehicle, said bell having an infinite variety of operable static positions on said support post to which said bell is adjustable with reference to said support post according to the position in which the retractor is oriented by virtue of installation in the vehicle; during dangerous situations said bell pivotable with reference to said support post on any one of said different support points within said interior pivot area; and said actuating means is disposed on top of said bell and is connected to said reel locking means, said actuating means having an unlocked position and a locked position, said actuating means being disposed in said unlocked position when said bell is in any one of said infinite variety of said operable static positions, said actuating means being moved to said locked position by said bell during dangerous situations to lock said reel and prevent further unwinding of said belt; and wherein:

said retractor has a longitudinal axis, and a support structure including two parallel side walls and a back wall, said side walls being disposed approximately perpendicular to said back wall;

said support post has a longitudinal axis which is disposed substantially parallel to said side walls and said back wall;

said bell has a longitudianl axis; and the static position of said bell is adjustable in any direction from a static position wherein said longitudinal axis of said bell is disposed at an angle of approximately 0° to an angle of approximately 30° with reference to the longitudinal axis of said support post.

7. In a vehicle-sensitive, inertia-operated safety belt retractor with a reel for winding the safety belt, means to lock the reel and thereby restrain an occupant of a vehicle during emergency situations, an inertia mechanism, a support means mounted on said retractor for supporting the inertia mechanism and an actuating means responsive to said inertia mechanism for operating the means for locking the reel, the improvement wherein:

said inertia mechanism is a concave inertia member which rests on said support means, said inertia member having a hollow interior, an open bottom and an interior surface; approximately the upper half of said interior surface of said inertia member having a substantially hermispherical interior pivot area; a portion of said support means extending through the open bottom of said inertia member into said hollow interior of said inertia member; said inertia member having a plurality of support points within said interior pivot area of said inertia member, said support means supporting said inertia member at different support points within said interior pivot area of said inertia member depending upon the orientation of said retractor resulting from installation in a vehicle, said inertia member having an infinite variety of operable static positions on said support means to which said inertia member is adjustable with reference to said support means according to the position in which the retractor is oriented by virtue of installation in the vehicle; during dangerous situations said inertia member pivotable with reference to said support means on any one of said different support points within said interior pivot area; and said actuating means is disposed between said inertia member and said reel locking means, said actuating means having an unlocked position and a locked position, said actuating means being disposed in said unlocked position when said inertia member is in any one of said infinite variety of said operable static positions, said actuating means being moved to said locked position by said inertia member during dangerous situations to lock said reel and prevent further unwinding of said belt;

said retractor has a longitudinal axis, and a support structure including two parallel side walls and a back wall, said side walls being disposed approximately perpendicular to said back wall;

said support means has a longitudinal axis which is disposed substantially parallel to said side walls and said back wall;

said inertia member has a longitudinal axis; and said static position of said inertia member is adjustable in any direction from a static position wherein said longitudinal axis of said inertia member is disposed at an angle of approximately 0° to an angle of approximately 30° with reference to the longitudinal axis of said support means.

8. In a vehicle-sensitive, inertia-operated safety belt retractor with a reel for winding the safety belt, means to lock the reel and thereby restrain an occupant of a vehicle during emergency situations, an inertia mechanism, a support means mounted on said retractor for supporting the inertia mechanism and an actuating means responsive to said inertia mechanism for operating the means for locking the reel, the improvement wherein:

said inertia mechanism is an inertia member which rests on said support means, said inertia member having a hollow interior, an open bottom and an interior surface; an upper portion of said interior surface of said inertia member having a substantially hemispherical interior pivot area; a portion of said support means extending through the open bottom of said inertia member into said hollow interior of said inertia member; said inertia member having a plurality of support points within said interior pivot area of said inertia member, said support means supporting said inertia member at different support points within said interior pivot area of said inertia member depending upon the orientation of said retractor resulting from installation in a vehicle, said inertia member having a variety of operable static positions on said support means to which said inertia member is adjustable with reference to said support means according to the position in which the retractor is oriented by virtue of installation in the vehicle; during dangerous situations said inertia member pivotable with reference to said support means on at least one of said different support points within said interior pivot area; and said actuating means is disposed between said inertia member and said reel locking means, said actuating means having an unlocked position and a locked position, said actuating means disposed in said unlocked position when said inertia member is in any one of said variety of said operable static positions, said actuating means being moved to said locked position by said inertia member during dangerous situations to lock said reel and prevent further unwinding of said belt.

* * * * *